(12) United States Patent
Basu et al.

(10) Patent No.: US 7,959,156 B2
(45) Date of Patent: Jun. 14, 2011

(54) MECHANICAL SEAL WITH ENHANCED FACE STABILITY

(75) Inventors: Prithwish Basu, Providence, RI (US); David P. Casucci, Coventry, RI (US)

(73) Assignee: John Crane Inc., Morton Grove, IL (US)

( * ) Notice: Subject to any disclaimer, the term of this patent is extended or adjusted under 35 U.S.C. 154(b) by 644 days.

(21) Appl. No.: 11/683,202

(22) Filed: Mar. 7, 2007

(65) Prior Publication Data
US 2007/0210526 A1 Sep. 13, 2007

Related U.S. Application Data

(60) Provisional application No. 60/780,334, filed on Mar. 8, 2006.

(51) Int. Cl.
*F16J 15/34* (2006.01)

(52) U.S. Cl. ........................ 277/370; 277/360

(58) Field of Classification Search .............. 277/358, 277/370, 389, 390, 391, 393
See application file for complete search history.

(56) References Cited

U.S. PATENT DOCUMENTS

| | | | |
|---|---|---|---|
| 2,941,825 A | 6/1960 | Heinrich | |
| 3,131,941 A | 5/1964 | Donley | |
| 3,560,004 A | 2/1971 | Donley et al. | |
| 3,765,689 A | 10/1973 | Adams | |
| 4,169,603 A * | 10/1979 | Funk | 277/348 |
| 4,261,581 A | 4/1981 | Hershey | |
| 4,335,888 A | 6/1982 | Ohba et al. | |
| 4,364,571 A | 12/1982 | Hershey | |
| 4,365,816 A | 12/1982 | Johnson et al. | |
| 4,744,569 A | 5/1988 | Wentworth, Jr. | |
| 4,889,350 A | 12/1989 | Tranter | |
| 4,971,337 A | 11/1990 | Hufford | |
| 5,042,824 A | 8/1991 | Gardner et al. | |
| 5,901,965 A | 5/1999 | Ringer et al. | |
| 5,954,341 A | 9/1999 | Ringer et al. | |
| 6,113,106 A * | 9/2000 | Dahlheimer | 277/433 |
| 6,299,173 B1 | 10/2001 | Lai | |
| 6,464,231 B2 * | 10/2002 | Burroughs | 277/385 |
| 2004/0212154 A1 * | 10/2004 | Yada et al. | 277/512 |

OTHER PUBLICATIONS

Form PCT/ISA/206, PCT Invitation to Pay Additional Fees, Dated Jul. 4, 2008, International Application No. PCT/US2007/063576.
Form PCT/ISA/237, PCT Written Opinion of the International Search Authority, International Application No. PCT/US2007/063576.
Form PCT/ISA/210, PCT International Search Report, International Application No. PCT/US2007/063576.
John Crane Presentation Materials, entitled "John Crane Belfab Sealing Systems" (1996).
John Crane Introduction Information for Type 215, 315, 715, 15WRS Metal Bellows Product (1986).

* cited by examiner

*Primary Examiner* — Shane Bomar
*Assistant Examiner* — Gilbert Y Lee
(74) *Attorney, Agent, or Firm* — Leydig, Voit & Mayer, Ltd.

(57) ABSTRACT

A seal assembly for use with a rotating shaft comprises a seal ring, a seal ring shell and bellows. The seal ring defines an axially extending annular surface and a radially extending seal face. The seal ring shell includes a foot portion connected to a radially extending shin portion located radially outward of the foot portion. The foot portion defining an axially extending engagement surface in interference-fit engagement with the annular surface of the seal ring. The engagement surface is positioned so as to have a near-zero moment about the center of gravity of the seal ring due to the engagement. The bellows defines an effective diameter at zero pressure applied on the seal ring. The interface of the foot portion with the seal ring defines an interference diameter.

22 Claims, 7 Drawing Sheets

MECHANICAL SEAL WITH ENHANCED FACE STABILITY

This application claims priority pursuant to 35 U.S.C. §119 to U.S. Provisional Application No. 60/780,334, filed Mar. 8, 2006.

BACKGROUND OF THE INVENTION

This invention relates to mechanical end face seal assemblies. More particularly, it relates to seal assemblies suitable for applications to a wide range of temperature and pressure operating environments.

Pumps, especially those in refineries and chemical plants, often handle difficult-to-seal liquids, including propane, butane, and other unstable, combustible, or toxic liquids. These liquids can cause short seal life and undesirable product leakage, prompting the passage of state health and safety pump emission regulations.

Mechanical end face seal assemblies are known and represent a successful solution to product leakage. Mechanical end face seal assemblies find wide applications in sealing liquids in pumps having a housing and an extending rotating shaft. The seal assemblies usually include a pair of annular seal rings that define a pair of relatively radial annular seal faces urged together to define a sealing interface. These seal rings are supported on the shaft and housing by assembly components. One seal ring, the primary ring, is axially movable and is urged by a compression spring or a metal bellows into face-to-face contact with the other seal ring, the mating ring, which is fixed against axial movement. The seal assembly can include either a single seal or a double seal where a buffer fluid pressure is supplied at a pressure higher than the process fluid to be sealed in order to prevent leakage of the process fluid across the seal ring face. Such mechanical seals are available from John Crane, Inc. and are disclosed in U.S. Pat. Nos. 5,901,965 and 5,954,341, the disclosures of which are incorporated herein by reference. The present invention represents a refinement in the mechanical seals of the type in U.S. Pat. Nos. 5,901,965 and 5,954,341.

Figure 1:
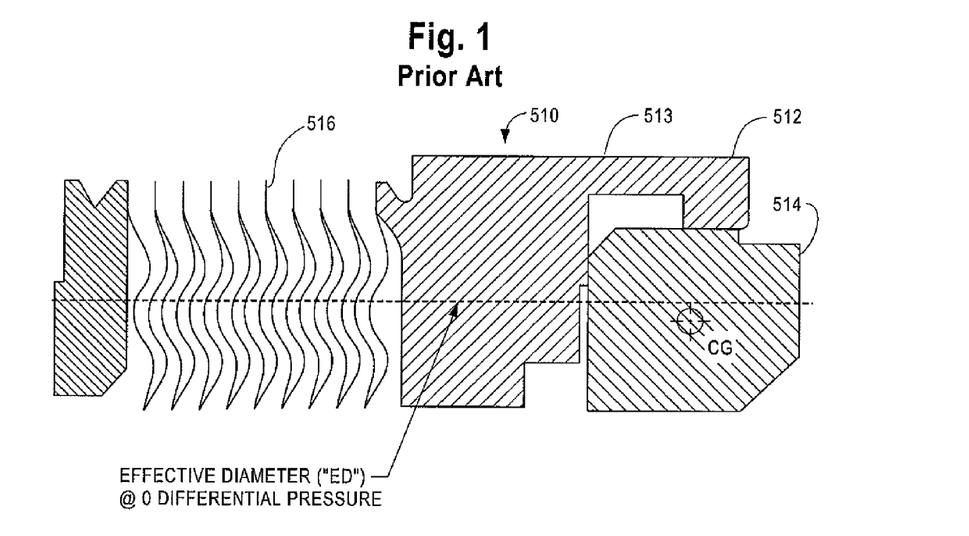
FIG. 1 is a cross-sectional view of a conventional (prior art) primary ring assembly of a bellows mechanical seal.

FIG. 1 shows a conventional (prior art) primary ring assembly 510 of a mechanical seal. The primary ring assembly 510 of the mechanical seal includes a primary ring 514 fitted against a primary ring shell 512 using a press fitting or a thermal shrink fitting technique, and a bellows 516 attached to a side of primary ring shell 512. Press fitting or thermal shrink fitting provides a very tight interference fit between primary ring 514 and primary ring shell 512, wherein primary ring 514 is radially and axially fixed to primary ring shell 512. In press fitting, mating parts, on which the outer dimension of the interior member is the same as or slightly greater than the interior dimension of the exterior member, are forced together. In shrink fitting, the parts are joined by contracting (shrinking) the interior part by cooling and inserting the interior part into the exterior part. Subsequent expansion of the interior part by its return to ambient temperature ensures a tight fit. Alternatively, the parts are joined by expanding the exterior part by heating and inserting the interior part into the exterior part. Subsequent contraction of the exterior part by its return to ambient temperature ensures a tight fit.

The interference fit between primary ring 514 and primary ring shell 512, acts as a secondary static seal prohibiting sealed process fluid from leaking between primary ring 514 and primary ring shell 512. Also, the contact friction between primary ring 514 and primary ring shell 512 caused by the interference fit prohibits relative circumferential movement of primary ring 514 with respect to primary ring shell 512.

The amount of interference for a given seal size depends on the nominal interference diameter, the differential thermal expansion coefficients of the shell and primary ring materials of construction, and the maximum operating temperature. The representative values of the thermal expansion coefficient of some typical shell and primary ring materials are presented in Table 1.

TABLE 1

| Typical Thermal Expansion Coefficients ($\times 10^{-6}$ in/in° F.) | | | | |
|---|---|---|---|---|
| Shell Materials | | Primary Ring Materials | | |
| Alloy 718 | Alloy 42 | Carbon | WC | SiC |
| 7.1 | 2.4 | 2.5 | 2.9 | 2.4 |

Alloy 718 and Alloy 42, possible materials for forming the shell, are well known alloys and are commercially available from several material suppliers. As seen, Alloy-42 has a low coefficient of thermal expansion that closely matches that of the primary ring materials and hence, is sometimes a good choice as the shell material of construction. Unfortunately, the high temperature applications containing corrosive organic acids and high sulfur compounds tend to readily corrode the Alloy-42 shell. A common industry practice is to apply chrome plating to the Alloy-42 shell component to protect it from corrosive attack. However, such chrome plating is not considered to be effective, as it serves in only prolonging the inevitability of the corrosive invasiveness.

Figure 2:
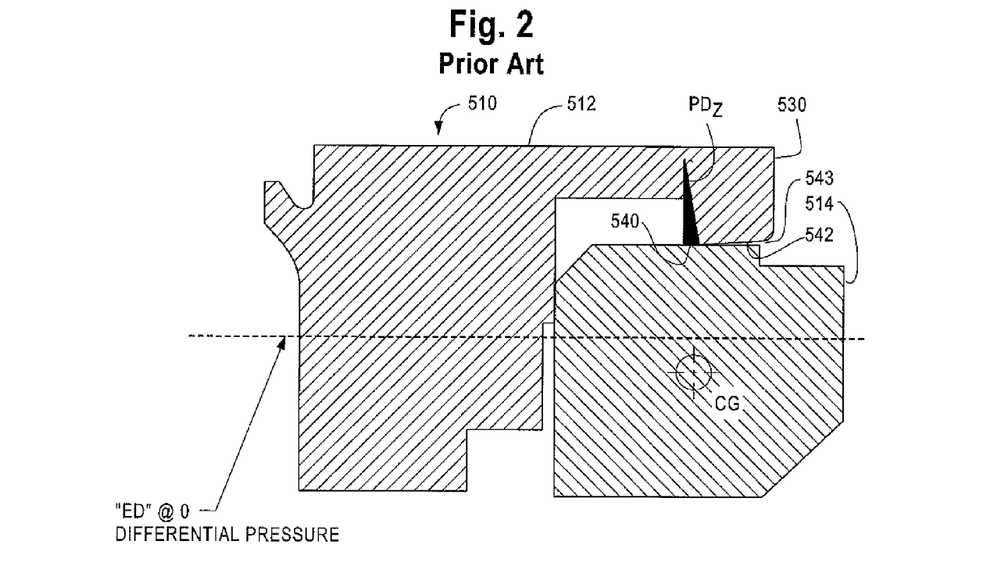
FIG. 2 is a cross-sectional free-body diagram of the conventional (prior art) primary ring assembly of FIG. 1, showing contact pressure distribution under room temperature and no differential pressure applied on the primary ring by process/barrier liquid.
Figure 3:
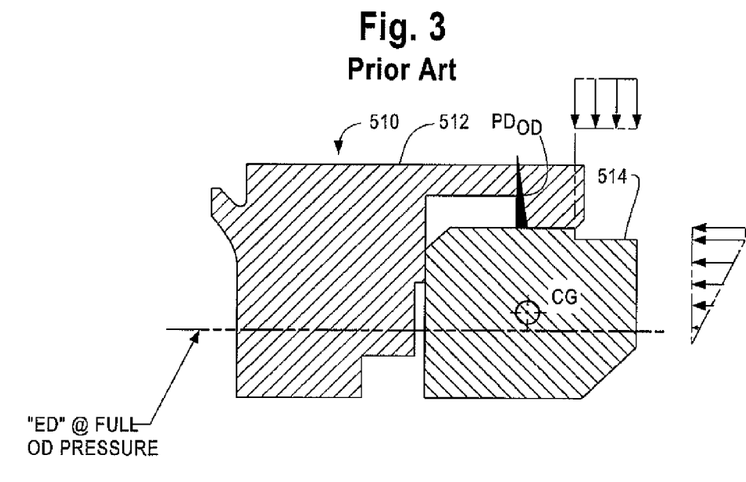
FIG. 3 is a cross-sectional free-body diagram of the conventional (prior art) primary ring assembly of FIG. 1, showing forces and contact pressure distribution under full operating temperature and external pressure applied on the primary ring by process/barrier liquid.
Figure 4:
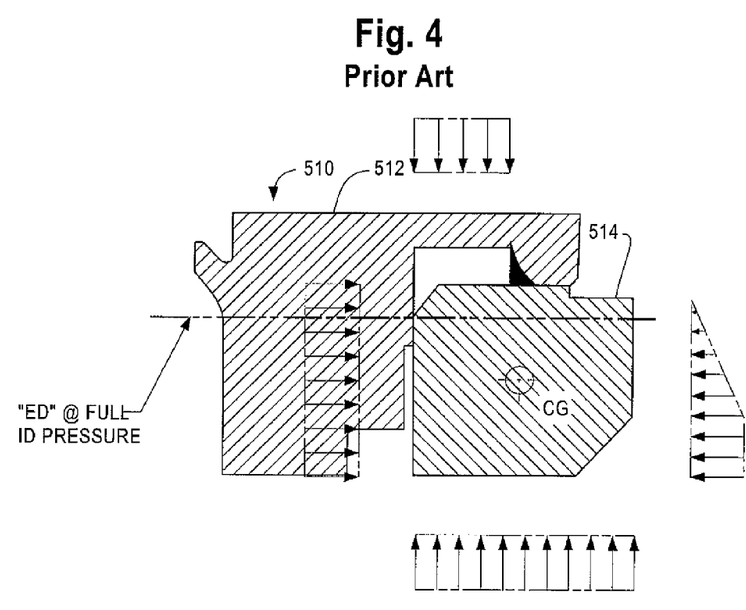
FIG. 4 is a cross-sectional free-body diagram of the conventional (prior art) primary ring assembly of FIG. 1, showing forces and contact pressure distribution under full operating temperature and internal pressure applied on the primary ring by process/barrier liquid.

There are also a few difficult challenges associated with constructing the shell from Alloy-718 when used with a conventional interference-fitted primary ring design. FIG. 2 shows a diagram of a conventional (prior art) design, which has a single piece primary ring shell 514. A typical contact pressure distribution $PD_Z$ for such a conventional seal is also shown in FIG. 2. As seen in FIGS. 2, the contact extent is confined to a quite narrow region near the heel 540 of the engaging foot portion 530. This narrow contact region creates a small gap 543 near the toe 542 of the engaging foot portion 530. FIG. 3 shows the contact pressure distribution $PD_{OD}$ under full operating temperature and external pressure applied on the primary ring 514 by process/barrier liquid. FIG. 4 shows the contact pressure distribution $PD_{ID}$ under full operating temperature and internal pressure applied on the primary ring by process/barrier liquid.

Another challenge associated with the one-piece primary ring shell 512 arrangement as shown in FIG. 1 is that during interference fitting of the primary ring 514 with the primary ring shell 512, high bending stresses and moments are created in the area of the hinge 513 of the shell 512. These high bending stresses may cause the shell 512 to crack or fracture at the hinge 513 during the interference fitting process.

DETAILED DESCRIPTION OF THE ILLUSTRATED EMBODIMENT

High temperature crude corrosiveness is becoming a major concern in refineries due to an increased use of sour crudes containing the above organic acids and sulphur compounds. One of the embodiments of the present invention calls for complete Alloy-718 metallurgy, which is resistant to the corrosive attack even at high temperature. In addition, heat-treated Alloy-718 retains its inherent strength much better at high temperatures, e.g. 800° F. or higher. As seen in Table 2, Alloy-42 not only has a much lower relative strength at room temperature to start with, but also its strength drops considerably at higher temperatures. On the other hand, Alloy-718 is not only several times stronger than the Alloy-42 at room temperature, but also retains it high strength much better at higher temperature than Alloy-42.

TABLE 2

| | Yield Strength (KSI) | |
|---|---|---|
| Temp (° F.) | Alloy 718 | Alloy 42 |
| 70 | 125 | 40 |
| 1000 | 90 | 14 |

Hence, a natural choice of the shell material for high-temperature corrosive applications is Alloy-718. However, as seen in Table 1, the differential thermal expansion coefficient between an Alloy-718 shell and a commonly used primary ring material is much higher than that with Alloy-42. Therefore, a much higher interference is required between them in order to keep the shell properly secured at high temperature operations. Typically, depending on the size, the diametrical interference required for an Alloy-718 shell and a typical primary ring ranges from 0.0010-0.030 in, whereas the same for Alloy-42 is in the neighborhood of 0.002-0.005 in.

The mechanical seal design of the present invention provides highly enhanced face stability compared to prior art mechanical seal designs because it is thermally insensitive and maintains axially constant contact stresses in the shell/adapter, interference-fit region. The seal can adapt to a wide-range of temperature extremes found in applications such as pumps operating in high-temperature corrosive environments in refinery distillation units. This face stability as well as the structural integrity of the components is maintained even with a relatively high amount of the interference-fit between the shell and the primary ring. This high interference level is essential to accommodate vastly different thermal expansion coefficients of the shell and the seal ring materials, which are dictated by a demanding application, described above. Such exceptional face stability results in reduced leakage and potentially longer seal life. This seal can be designed with dual pressure capability, which can operate with higher-pressure process/barrier liquid either at the external or the internal location.

The subject invention of the seal ring assembly can be either stationary attached to the housing, which is capable of handling high shaft speed applications and high shaft-to-seal chamber misalignment, or it can be mounted on the shaft, intended for applications where a dependable, high-strength rotating seal is preferred. Some typical operating limits are:

Temperature limits: −100° F. to 800° F.
Pressure limits: <300 psid with single-ply bellows,
>300 psid with multiple-ply bellows (external or internal pressure capability).
Face speed limits: 10,000 fpm (Stationary arrangement).
5,000 fpm (Rotating arrangement).
Fluid characteristics : Corrosive or non-corrosive.

Figure 5:
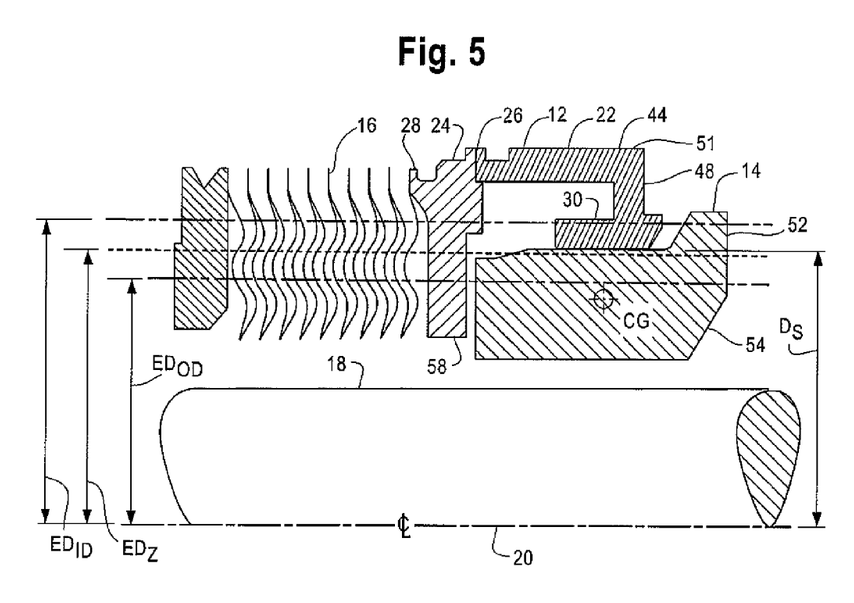
FIG. 5 is a cross-sectional view of a primary ring assembly of a bellows mechanical seal embodying the features of the present invention.
Figure 5A:
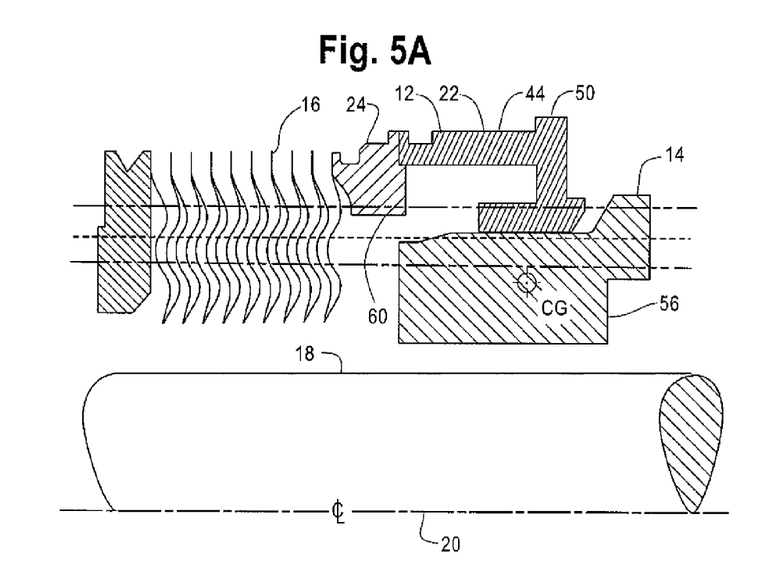
FIG. 5A is a cross-sectional view of an alternative primary ring and an alternative primary ring shell embodying the features of the present invention.
Figure 6:
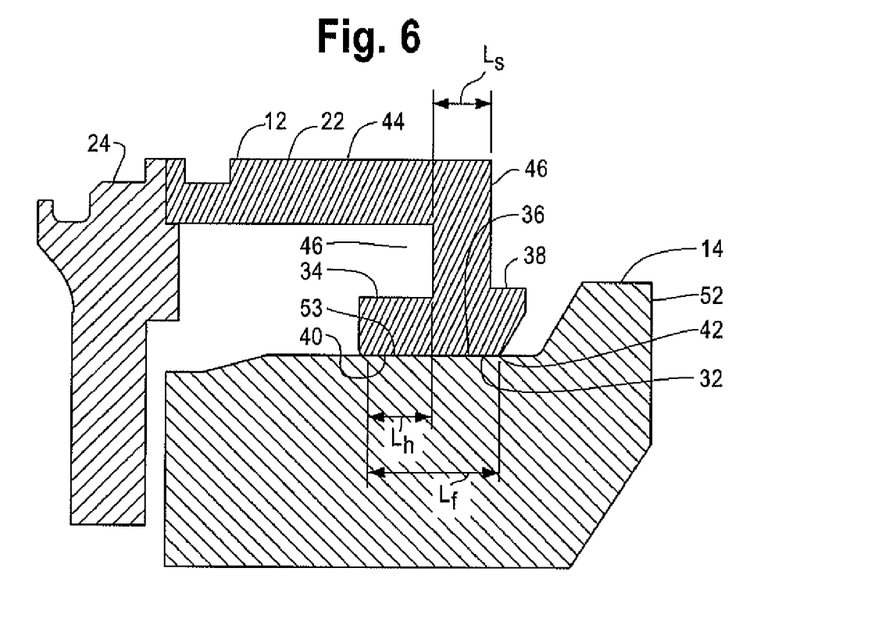
FIG. 6 is an enlarged cross-sectional view of the primary ring and primary ring shell of the primary ring assembly of FIG. 5.

FIGS. 5 and 6 illustrate an embodiment of a primary ring assembly 10 embodying the present invention. The primary ring assembly 10 includes a primary ring shell 12, a primary ring 14 and bellows 16. A rotating shaft 18, centered about a longitudinal axis 20, extends through the primary ring assembly 10. It should be noted that the term axial and axially as used in describing the embodiments mean longitinually along the axis 20 of the shaft 18. The terms radial and radially as used in describing the embodiments mean in a plane generally perpendicular to the axis 20 of the shaft 18 toward and away from the axis.

The primary ring 14 defines an axially extending annular outer surface 53 and a radially extending seal face 52. The annular outer surface 53 is a section of the outer surface of the primary ring 14 adapted for engagement with the shell 12, to be discussed further below. It should be noted that the annular outer surface 53 is not necessarily a radially outermost surface, as evidenced by the annular surface adjacent to the seal face 52 located more radially outward. The seal face 52 of the primary ring 52 is adapted for engagement with a corresponding seal face of a mating ring. Possible materials for construction of the primary ring 14 include carbon, impregnated carbon, tungsten carbide (WC), silicon carbide (SiC), silicon/carbon graphite composite, and bronze.

The shell 12 is made up of two pieces—a front-piece 22 and a back-piece 24, which are welded together at their junction 26. Possible materials for construction of the primary ring shell pieces 22 and 24 include Alloy 718, Alloy 625, Alloy 620, Alloy 20, Hastelloy, AM 350, and stainless steel. Preferably the material for construction of primary ring shell pieces 22 and 24 is Alloy 718. The bellows 16 is welded to the back-piece shell 24 at their junction 28. The bellows 16 can be of single or multi-ply construction. Possible materials for construction of the bellows 16 include Alloy 718, Hastelloy, AM350, Alloy 20, and stainless steel. Preferably the material for construction of the bellows 16 is Alloy 718. Hereinafter, this new design, the subject of this current invention disclosure, will be referred to as the high temperature and corrosive application seal or "HTC" seal in short.

This two-piece shell arrangement utilizes an optimized geometrical shape that may be quite intricate but can be machined into the front-piece 22. The ultimate goal has been to achieve optimum seal face stability over the operating temperature and pressure ranges having minimum amount of face coning in either direction, which is commonly known as "OD" or "ID high." Such enhanced face stability, in turn, results in reduced leakage and longer seal life. The enhanced, two-piece design can be used to attach a seal face to most traditional seal designs (i.e., pusher) with the similar performance benefits.

The front-piece shell 22 is shown to have an engaging foot portion 30 into which the primary ring 14 is interference-fitted. The engaging foot portion 30 defines an axially extending engagement surface 32 for interference-fit engagement with annular surface 53 of the primary ring 14. The foot portion 30 has an inner foot portion 34, a middle foot portion 36, and an outer foot portion 38. The contact region of the engagement surface 32 at the back of the engaging foot portion is the heel 40 and its front part is the toe 42. Between the inner foot portion 34 and an upper shell region or thigh portion 44, there is a recess 46, whereas the annular region joining the thigh portion 44 and the foot portion 30 is the shin portion 48. The shin portion 48 extends radially from the foot portion 30. There may also be a radially extending hub portion 50 above the connection of the shin portion 48 with the thigh portion 44, as illustrated in FIG. 6. A front shell 22 with the hub portion omitted is shown by line 51 in FIG. 5. The shin portion 48 has an axial length $L_s$ that allows the shin portion to flex upon the primary ring 14 interference-fitted into the front piece shell 22. The inner foot portion 34 at its engagement surface, near the heal 40, has an axial length $L_h$. The foot portion 30 at its engagement surface 32 has an axial length $L_f$. The axial length $L_f$ of tie foot portion 30 at its engagement surface is preferably greater than the axial length $L_s$ of the shin portion. This increased contact region between the foot portion 30 and the primary ring 14, as compared to prior art seal designs, allows the contact pressure at the interface to be less concentrated at one particular point.

To control the contract pressure distribution caused by the interference fit between the foot portion and the seal ring mating surface, preferably, the ratio ($L_h/L_f$) of inner foot portion length $L_h$ at its engagement surface to foot portion length $L_f$ at its engagement surface is greater than 0.5. More preferably, the ratio ($L_h/L_f$) of inner foot portion length $L_h$ at its engagement surface to foot portion length $L_f$ at its engagement surface is between 0.556 and 0.625. It is important to distribute this contact pressure about the body center of rotation to achieve a near zero net moment on the primary seal. This is necessary to maintain face flatness as the application pressure and temperature change. Traditional shell designs, having an inner foot portion length to foot portion length at their engagement surfaces ratio closer to zero (0), do not have an evenly distributed contact pressure and exhibit difficulty controlling face flatness.

The dimensions (e.g. lengths and thicknesses) of all these aforesaid regions described in the previous paragraphs, including the primary ring dimensions, are treated as parameters for the optimization process and are iteratively designed to get optimal performance characteristics. These control parameters allow for precise adjustment to control the interference contact pressure, the contact stress, and face stability for a variety of primary ring geometries over a wide range of operating temperatures and pressures or a specific set of temperatures and pressures. The optimized design is thermally insensitive and has an axially constant contact stress distribution in the interference-fit region. The control parameters: inner foot portion 34, outer foot portion 38, shin portion 48, hub portion 50 and thigh portion 44, can be adjusted in thickness and length to accommodate varying primary ring geometries. Primary seal geometries that tend to be more asymmetrical about the cross-sectional center of gravity/rotation, would require more asymmetry in the lengths and thicknesses of these control parameters. The relative location of the front-piece shell with respect to the primary seal is also a design control parameter to further manage face coning due to relaxation of the interference-fit caused by changes in temperature.

The interference-fitted design between the shell 12 and primary ring 14 eliminates the need of any secondary sealing components, such as flexible graphite disclosed in U.S. Pat. No. 4,971,337 which may be problematic because its uneven surface is in contact with the shell back, the signature of which may be partially transmitted to the seal face. The front-piece shell 22 is joined to the back-piece shell 24 after the initial interference-fitting of the front piece shell 22 with the primary ring 14. This process eliminates bending stresses and moments in the area of the hinge that are present in the traditional one-piece arrangements, such as the seal assembly shown in FIG. 1.

In this embodiment, the nominal interference diameter $D_S$, which is also called the sealing diameter, is designed to be very close to the Mean Effective Diameter $ED_Z$ of the bellows as shown in FIG. 5. The Effective Diameter or "ED" of a bellows is a fictitious diameter up to which the applied pressure effectively penetrates to exert a closing force on the seal. This is akin to the "balance diameter" of a pusher-type seal. The Mean Effective Diameter is a theoretical effective diameter at zero differential pressure applied on the seal ring 14, which is taken to be the arithmetic mean of the bellows core outside and inside diameters. The seal face 52 of the primary ring 14 is designed so that the Mean Effective Diameter position gives rise to an initial balance at zero differential pressure in which the radial centerline of the seal face 52 is near the Mean Effective Diameter $ED_Z$ as shown in FIG. 5.

The primary ring 14 of this particular embodiment is asymmetrical and balanced. This primary ring 14 is considered asymmetrical because the two sides of the primary ring 14 located axially from its center of gravity CG are not symmetrical. This primary ring is considered balanced because the radial centerline of the seal face 52 is located near the effective diameter $ED_Z$ of the bellows 16 at zero differential pressure.

Figure 8:
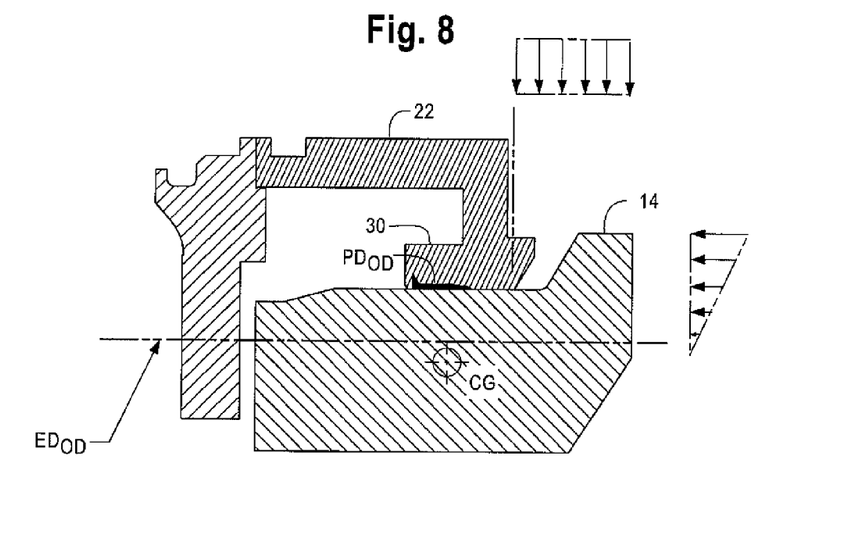
FIG. 8 is a cross-sectional free-body diagram of the primary ring assembly of FIG. 5, showing contact forces and contract pressure distribution under full operating temperature and external pressure applied by process/barrier liquid.

When the full external pressure differential is applied, the bellows effective diameter shifts downward to a lower value $ED_{OD}$, as shown in FIGS. 5 and 8. Again, the seal face has been so designed that the above ED shift increases the balance ratio to an adequate level, which is based on the prior experience with conventional seals, so that leakage is minimized with optimum wear.

FIG. 8 shows the external pressure acting on the primary ring 14. As seen, while the full external pressure acts on the overhung portion of the primary ring 14 outside the engaging foot portion 30 of the shell 12, on the face 52, however, the pressure decreases to a zero differential level at the ID. Although the face pressure profile is shown to be linear, which is the case with a parallel seal interface, in actuality, it could be curved inward or outward, depending on the operating face coning.

The net axial force acting on the primary ring is tending to cause axial slippage between the primary ring 14 and the shell 12 at the contact region and push the primary ring 14 towards the back-piece shell 24. In addition, the mating ring face, not shown in the FIG. 8, tends to cause rotational slippage at the contact region due to the face contact load and the corresponding interface friction. The net axial slippage force can be shown to be approximately equal to the external pressure times the annular area between the sealing diameter (or nominal interference diameter) and the effective diameter at full external pressure plus the initial bellows spring load. The level of the initial interference between the shell 12 and the primary ring 14 is chosen in such a way that at the full external pressure and the maximum operating temperature, the average contact pressure level is more than adequate to resist primary ring slippage in the axial as well as the rotational direction.

Figure 9:
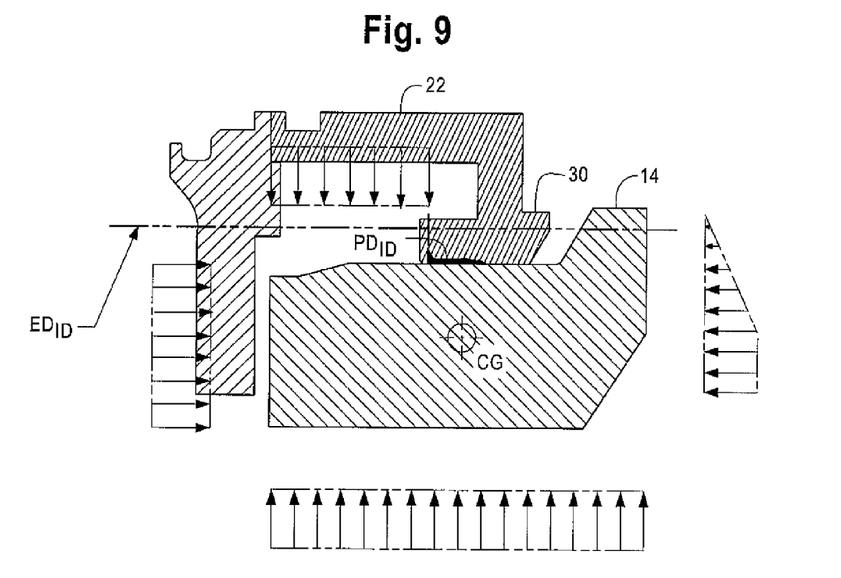
FIG. 9 is a cross-sectional free-body diagram of the primary ring assembly of FIG. 5, showing contact forces and contract pressure distribution under full operating temperature and internal pressure applied by process/barrier liquid.

Similarly, when the full internal differential pressure is applied, the bellows effective diameter shift upward from $ED_Z$ to $ED_{ID}$, as shown in FIGS. 5 and 9. Similar to the external pressure situation, the seal face design ensures that the new balance ratio at the full internal pressure meets the design requirement.

By locating the inference diameter $D_S$ very close to the effective diameter $ED_Z$ of the bellows at zero differential pressure, the net axial force in the axial direction is minimized under internal pressure and external pressure as provided above. Preferably, the interference diameter $D_S$ is within plus and minus 10% (+10% and −10%) of the effective diameter $ED_Z$ of the bellows at zero differential pressure. More preferably, the interference diameter $D_S$ is within +6% and −6% of the effective diameter $ED_Z$ of the bellows at zero pressure. It is important to minimize the hydraulic forces acting in an axial direction to move the primary seal relative to the shell. As these forces increase, the amount of contact force provided by the interference fit must be increased to prevent movement.

As discussed above, while the interference fit diameter does not change, the effective diameter does vary with system pressure. Depending on the application, it may be desirable to bias the interference diameter toward either extreme of the effective diameter shift range.

Again, as before, the net axial force on the primary ring 14 that is tending to cause axial slippage is approximately equal to the internal pressure times the annular area between the effective diameter and the sealing diameter plus the initial bellows spring load. Again, the initial interference level is so chosen that average contact pressure magnitude at the full internal pressure and the maximum operating temperature is more than adequate to resist any primary ring slippage.

Hence, this design is capable of handling either external or internal pressure applications with a single bellows, whereas some prior designs required two different size bellows to achieve the same task. Many successful tests have been done in the laboratory to confirm this capability.

FIG. 5, shows one viable configuration of the front-piece shell, there are other embodiments that can be specialized from this general shape. These shapes include, but are not limited to, the inner foot portion 34 being shorter and/or thicker than the outer foot portion 38, the shin portion 40 shorter and/or thicker than what is shown, absence of the hub portion 50, absence of either inner foot portion 34 or outer foot portion 38, and the like.

Furthermore, two possible primary ring nose configurations are shown in FIGS. 5 and 6, one having a blunt nose 54 as shown in FIG. 5 and the other having a step nose 56 as shown in FIG. 6. The blunt-nose 54 configuration is typically used with the hard primary ring materials e.g. silicon and tungsten carbides, whereas the step-nose 56 configuration is typically used with the softer materials like carbon. Also, FIGS. 5 and 6 show two possible configurations of the back-piece shell 24. In the conventional configuration as shown in FIG. 5, this back-piece shell 24 inside diameter (ID) is extended low at 58 towards the inside diameter of primary ring 14. In the second configuration as shown in FIG. 6, the back-piece shell 24 is truncated at 60 to have a higher ID.

Figure 7:
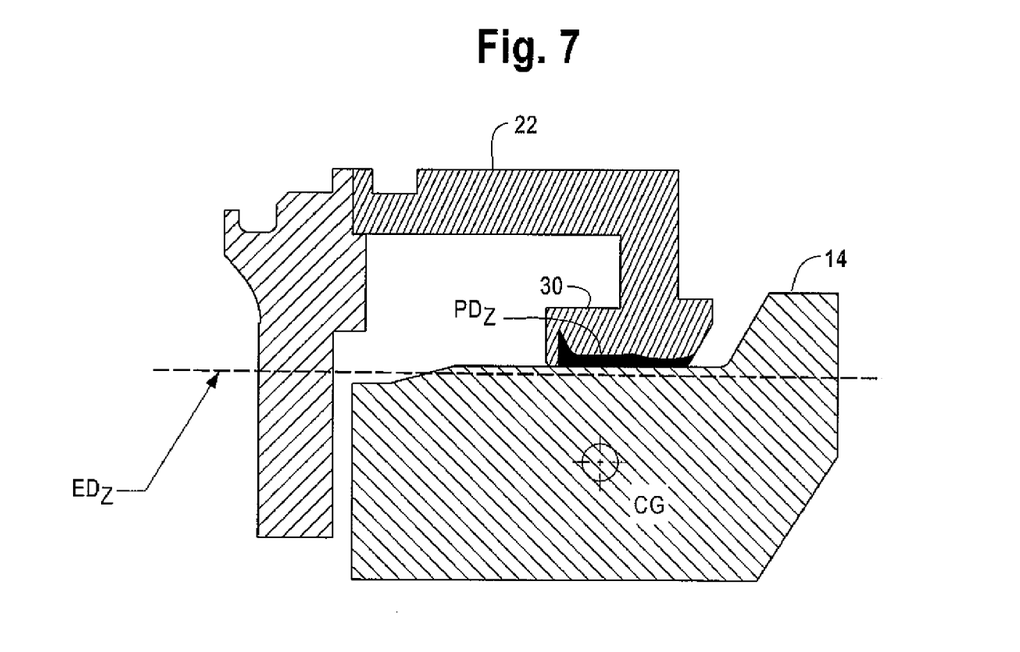
FIG. 7 is a cross-sectional free-body diagram of the primary ring assembly of FIG. 5, showing contact pressure distribution under room temperature and no differential pressure on the primary ring by process/barrier liquid.

To assemble the primary ring assembly 10 as shown in FIG. 5, the primary ring 14 is first interference-fitted into the front-piece shell 22 that is then welded to the back-piece shell 24 and the bellows 16. The shape of the front-piece shell 22 has been optimized in such a way that the extent of the contact region between its engaging foot portion 30 and the primary ring 14 is almost 100%, extending from its heel 40 to the toe 42, as illustrated by the contact pressure distribution $PD_Z$ in FIG. 7. In contrast, a conventionally interference-fitted primary-ring assembly 510 will have a relatively concentrated contact near the heel 540, extending over about 20% of the corresponding foot portion length as illustrated in FIG. 2. Consequently, the maximum contact pressure of the HTC design as shown in FIG. 7 is several times lower than that of a conventional design for the same level of interference shown in FIG. 2.

The primary ring 14 is positioned at an optimum depth with respect to the shell foot portion 30 so as to have a near-zero net moment about its center of gravity/rotation due to the above contact pressure distribution $PD_Z$. This situation would leave the seal face 52 to remain almost flat without any perceptible coning. This analytical finding has been repeatedly verified in the laboratory. This means that the optimally positioned primary ring, which is at a "stress-free state" before the interference-fitting operation, will remain free of any net twisting moment due to the contact pressure at its "fully stressed state" after the interference-fitting operation. Consequently, the primary ring seal face 52, which is initially lapped flat, will remain flat after interference-fitting into the front-piece shell at the optimum position. This is an unprecedented behavior, not observed with a traditionally interference-fitted seal design.

With the increase in temperature, as the effective interference between the shell 12 and primary ring 14 decreases because of their differential thermal expansion characteristics, the contact pressure level at the interference-fit region decreases as well. Consequently, the shell 12 and the primary ring 14 will gradually relax from the "fully stressed state" towards a relatively "lower stressed state". However, in the optimized design, the net moment due to the corresponding contact pressure distribution (although at a decreased level) about the primary ring center of rotation remains almost zero during this stress relaxation process and as a result, the seal face 52 tends to remain at near-perfect flatness condition over the entire range of temperature operation.

When full external pressure is applied on the primary ring 14, the magnitude and distribution of the contact pressure changes and the shell 12 and the primary ring 14 tend to separate near the toe 42. The degree of such separation depends on the initial interference and the applied temperature and pressure. FIG. 8 shows a representative contact pressure distribution $PD_{OD}$, with the contact extending over about 70% of the foot portion length. This extent of contact is much larger than that with a conventional prior art primary ring assembly 510 for which it is about 15% under similar circumstances as shown in FIG. 3. Such relatively larger contact support inherently gives rise to higher relative face stability as the primary ring 14 is inhibited from rotation due to any unbalanced net moment caused by the pressure application.

On the other hand, when internal pressure is applied on the primary ring 14, the contact region again tends to extend over 100% of the engaging foot portion 30, as shown by the representative contact pressure distribution $PD_{ID}$ in FIG. 9, giving further support to the primary ring 14 and imparting relatively enhanced face stability under such pressure condition, as before.

Through the optimization process, the front-piece shell 22 and the primary ring 14 are designed in such a way to obtain near zero nominal face deflection when the primary ring 14 is interference-fitted into the shell 12 so that the face flatness would change very little (e.g. a few Helium light bands) with temperature up to the operating temperature and any of its excursions. Secondly, the design is further optimized so that face-coning magnitudes due to the external and internal pressure conditions are not only minimized but also quite equal in magnitude so that a symmetric behavior is achieved with the directions of pressure application. Typically, with external pressure, the face coning is in the "OD high" direction whereas with the internal pressure, it is in the "ID high" direction. The magnitudes of the face coning for the external and the internal pressures are not only made almost equal through the optimization process, but also these values are appreciably less than those for a conventional interference-fitted seal. It may be noted that high face coning can be responsible for higher leakage as well as accelerated face wear.

There are several advantages with this new HTC seal design embodying the present invention as compared with a conventional seal. The seal design embodying the present invention provides full or nearly full contact over the interference-fit region leads to highly enhanced face stability with operating temperature and pressure in comparison with a conventional interference-fitted seal. Furthermore, because of an extended contact length and relatively uniform contact pressure distribution, much higher level of interference is possible between the shell and the primary ring without unduly stressing the primary ring locally and causing its breakage.

Figure 10:
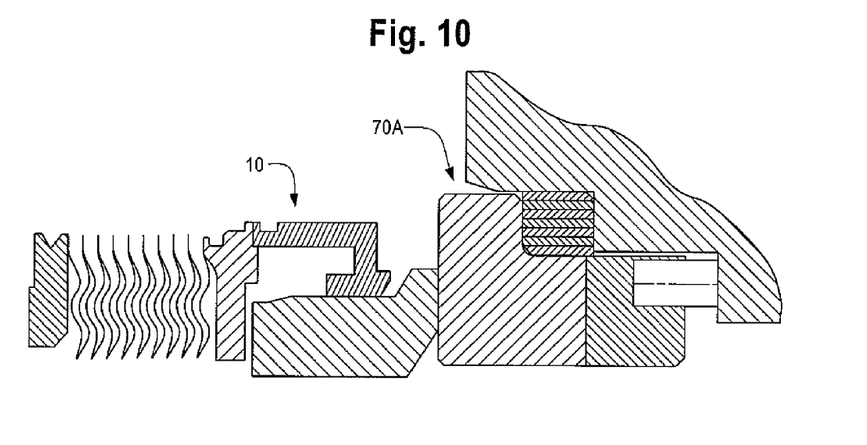
FIG. 10 is a cross-sectional view of the primary ring assembly of FIG. 5 used in conjunction with a conventional mating ring assembly.
Figure 11:
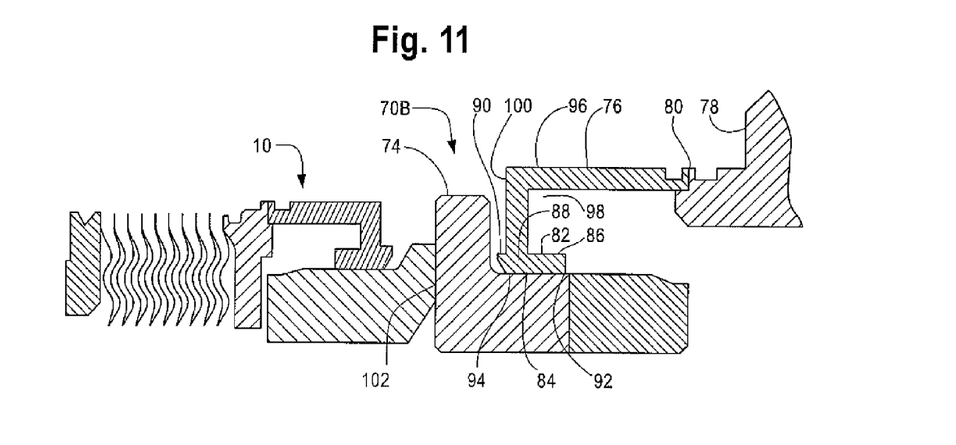
FIG. 11 is a cross-sectional view of the primary ring assembly of FIG. 5 used in conjunction with a mating ring assembly embodying the features of the present invention.

It should be noted that while the above embodiment describes the HTC seal design principles in association with a primary ring assembly, the HTC seal design principles are equally applicable to a mating ring assembly as discussed below. The primary ring assembly 10 of the present invention, described above, can have a mating ring assembly 70A of a conventional design, as shown in FIG. 10 or a mating ring assembly 70B, incorporating the HTC seal principles of the present invention, as shown in FIG. 11.

The mating ring assembly 70B, incorporating the HTC principles, includes a mating ring shell 72 and a mating ring 74. Possible materials for construction of the mating ring 74 include carbon, impregnated carbon, tungsten carbide, silicon carbide, silicon/carbon graphite composite, and bronze. The mating ring shell 72 is made up of two pieces a front-piece 76 and a back piece 78, which are welded together at their junction 80. Possible materials for construction of the mating ring shell pieces 76 and 78 include Alloy 718, Alloy 625, Alloy 620, Alloy 20, Hastelloy, AM 350, and stainless steel. Preferably the material for construction of mating ring shell pieces 76 and 78 is Alloy 718. Similar to the front piece 22 of the primary ring shell 12, the front-piece 76 of the mating ring shell 72 has an engaging foot portion 82 into which the mating ring 74 is interference-fitted. The engaging foot portion 82 of the mating ring shell 72 defines an engagement surface 84 for interference-fit engagement with the mating ring 74. The foot portion 82 has an inner foot portion 86, a middle foot portion 88, and an outer foot portion 90. The contact region of the engaging surface 84 at the back of the engaging foot portion is the heel 92 and its front part is the toe 94. Between the inner foot portion 86 and an upper shell region or thigh portion 96, there is a recess 98, wherein the annular region joined the thigh portion 96 and the foot portion 82 is the shin portion 100.

The dimensions (e.g. lengths and thicknesses) of all these aforesaid regions described in the previous paragraphs, including the mating ring dimensions, are treated as parameters for the optimization process. The location of the mating ring with respect to the foot portion is also an optimization parameter. By varying the thickness and length of these parameters, the contact stress and face stability are controlled resulting in a specific set of temperature and pressures.

Figure 12:
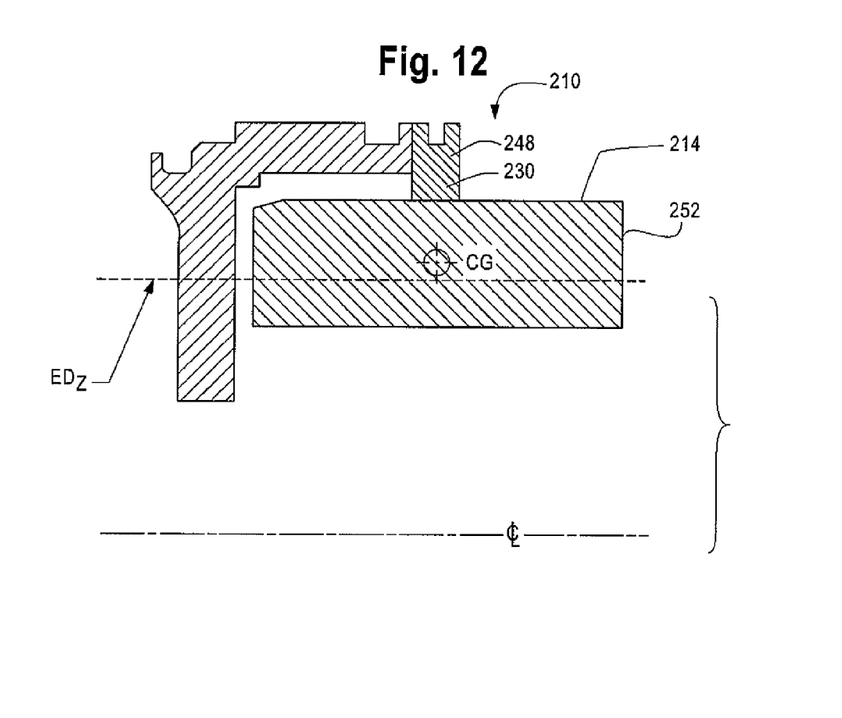
FIG. 12 is a cross-sectional view of an alternative primary ring assembly embodying the features of the present invention, with a symmetrical, unbalanced primary ring.

FIG. 12 illustrates an alternative primary ring assembly 210 in accordance to the present invention. The primary ring 214 of this alternative embodiment is symmetrical and unbalanced. This primary ring is considered symmetrical because the two sides of the primary ring 214 located axially from its center of gravity CG are essentially symmetrical. This primary ring is considered unbalance because the radial centerline of the seal face 252 is not located near the effective diameter $ED_Z$ of the bellows at zero differential pressure. It should be noted that the shape of the shin portion 248 and the foot portion 230 of the shell 212 is different than the shape of the shin portion 48 and the foot portion 30 of the primary ring assembly 10 illustrated in FIG. 5.

Figure 13:
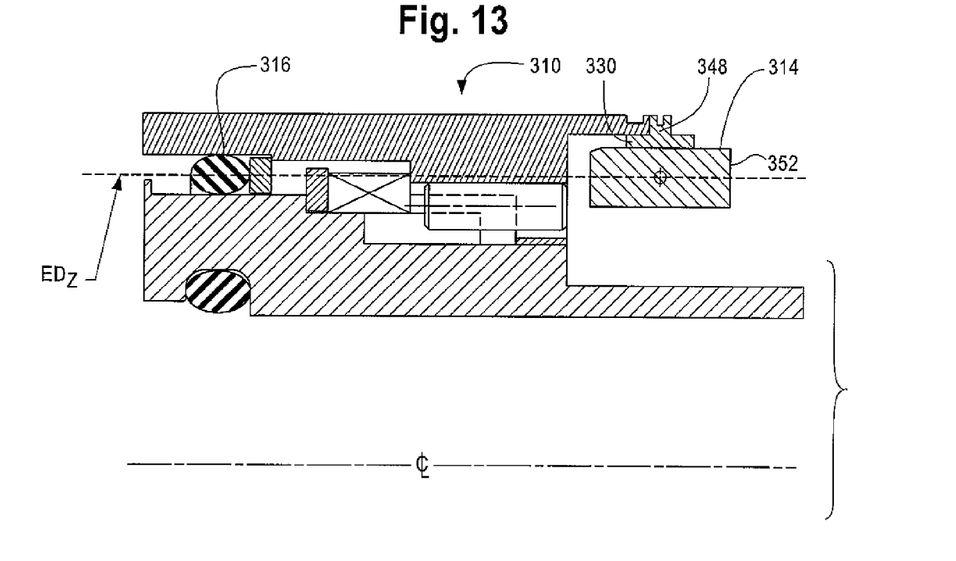
FIG. 13 is a cross-sectional view of an alternative primary ring assembly embodying the features of the present invention, with a symmetrical, balanced primary ring.

FIG. 13 illustrates a second alternative primary ring assembly 310 in accordance with the present invention. The primary ring 314 of this second alternative embodiment is symmetrical and balanced. This primary ring is considered symmetrical because the two sides of the primary ring 314 located axially from its center of gravity CG are essentially symmetrical. This primary ring is considered balance because the radial centerline of the seal face 352 is located near the effect diameter $ED_Z$ of the O-ring 316 at zero differential pressure. It should be noted that the shape of the shin portion 348 and foot portion 330 of the shell 312 is different than the shape of the shin portions 48 and 248 and foot portions 30 and 230 of the primary ring assemblies 10 and 210 illustrated in FIGS. 5 and 12.

Differences in the shapes of the shin portions and foot portions of the embodiments illustrated in FIGS. 5, 12 and 13 show that the optimal geometric dimensions of the shin portion and foot portion vary due to the shape of the primary ring and the radial centerline of the seal face relative to the effective diameter $ED_Z$ of the bellows/O-ring at zero differential pressure.

Various features of the present invention have been explained with reference to the embodiments shown and described. It must be understood that numerous modifications may be made without departing from the spirit and scope of the invention as defined by the appended claims.

The invention claimed is:

1. A seal assembly for use with a rotating shaft, the seal assembly comprising:
    an annular seal ring defining an interior member having an axially extending annular surface and a radially extending seal face, the cross sectional area thereof having a center of gravity (CG); and
    an annular seal ring shell defining an exterior member having a foot portion defining an axially extending engagement surface, said axially extending engagement surface of said foot portion and said axially extending annular surface of said annular seal ring in direct interference fit along an interference diameter $D_s$ between said axially extending engagement surface of said foot portion and said axially extending annular surface of said annular seal ring, said seal ring shell further includes a radially extending shin portion connected to said foot portion and located radially outward of said foot portion, said foot portion at its engagement surface has an axial length greater than the axial length of said shin portion, and said engagement surface positioned so as to have a near-zero net moment about said center of gravity due to such engagement.

2. The seal assembly as claimed in claim 1 wherein said foot portion further includes an inner foot portion extending axially from the connection of said foot portion with said shin portion.

3. The seal assembly as claimed in claim 2 wherein said inner foot portion at its engagement surface has an axial length, the ratio of the length of the inner foot portion at its engagement surface to the length of the foot portion at its engagement surface is greater than 0.5.

4. The seal assembly as claimed in claim 3 wherein said inner foot portion extends axially from the connection of said foot portion with said shin portion in a direction away from said seal face of said seal ring.

5. The seal assembly as claimed in claim 3 wherein the ratio of the length of the inner foot portion at its engagement surface to the length of the foot portion at its engagement surface is between 0.556 and 0.625.

6. The seal assembly as claimed in claim 2 wherein said foot portion further includes an outer foot portion extending axially from the connection of said foot portion with said shin portion in a direction away from said inner foot portion.

7. The seal assembly as claimed in claim 1 wherein said seal ring shell further includes an axially extending thigh portion connected to said shin portion and located radially outward of said shin portion.

8. The seal assembly as claimed in claim 7 wherein said seal ring shell further includes a hub extending radially outward from the connection of said shin portion with said thigh portion.

9. The seal assembly as claimed in claim 6 further comprising a bellows and wherein said seal ring shell further includes a back piece secured to said thigh portion, said bellows secured to said back piece.

10. The seal assembly as claimed in claim 1 wherein said seal ring shell has a front piece and a back piece secured together.

11. The seal assembly as claimed in claim 10 wherein said seal ring shell further includes a welded joint securing said front piece to said back piece.

12. The seal assembly as claimed in claim 11 further comprising a bellows secured to said back piece of said shell.

13. The seal assembly as claimed in claim 1 wherein said seal ring shell is formed of Alloy 718.

14. The seal assembly as claimed in claim 1 wherein said seal ring is a primary ring axially movable with a shaft, said seal further comprising an annular mating ring fixed against axial movement and a mating ring shell, said mating ring defining an interior member having an axially extending annular surface and a radially extending seal face for engagement with said seal face of said primary ring, said mating ring shell defining an exterior member having a foot portion defining an axially extending engagement surface of said foot portion and said axially extending annular surface of said annular mating ring in direct interference fit along an interference diameter $D_s$ between said axially extending engagement surface, said axially extending engagement surface of said foot portion and said axially extending annular surface of said annular mating ring, said mating ring shell further includes a shin portion connected to said foot portion and located radially outward of said foot portion, said foot portion of said mating ring shell includes an inner foot portion extending axially from the connection of said foot portion with said shin portion.

15. The seal assembly as claimed in claim 14 wherein said foot portion of said mating ring shell further includes an outer foot portion extending axially from the connection of said foot portion with said shin portion in a direction away from said inner foot portion of said mating ring shell.

16. A seal assembly for use with a rotating shaft, the seal assembly comprising:
    an annular seal ring defining an interior member having an axially extending annular surface and a radial extending seal face, the cross-sectional area thereof having a center of gravity (CG);
    a bellows defining an effective diameter at zero differential pressure applied on said seal ring; and
    an annular seal ring shell having a front piece and a back piece secured together, said back piece secured to an end of said bellows, said front piece defining an exterior member, a foot portion defining an axially extending engagement surface, said axially extending engagement surface of said foot portion and said axially extending annular surface of said annular seal ring in direct interference fit along an interference diameter $D_s$ between said axially extending engagement surface of said foot portion and said axially extending annular surface of said annular seal ring said engagement surface positioned so as to have a near-zero net moment about said center of gravity due to such engagement and defines an interference diameter at the interface of said foot portion with said seal ring, the interference diameter is within +10% and −10% of said effective diameter of said bellows at zero differential pressure.

17. The seal assembly as claimed in claim 16 wherein the interference diameter is within +6% and −6% of said effective diameter of said bellows at zero differential pressure.

18. The seal assembly as claimed in claim 16 wherein said seal ring shell further includes a welded joint securing said front piece to said back piece.

19. The seal assembly as claimed in claim 16 wherein said seal ring shell is formed of Alloy 718.

20. The seal assembly as claimed in claim 16 wherein said foot portion further includes an outer foot portion extending axially from the connection of said foot portion with said shin portion in a direction away from said inner foot portion.

21. The seal assembly as claimed in claim 16 wherein said seal ring shell has a front piece and a back piece secured together.

22. The seal assembly as claimed in claim 16 wherein said seal ring shell is formed of Alloy 718.

* * * * *